(No Model.)
T. LEE.
COMBINED STRAINER AND TRAP FOR WATER PIPES, &c.
No. 335,366. Patented Feb. 2, 1886.
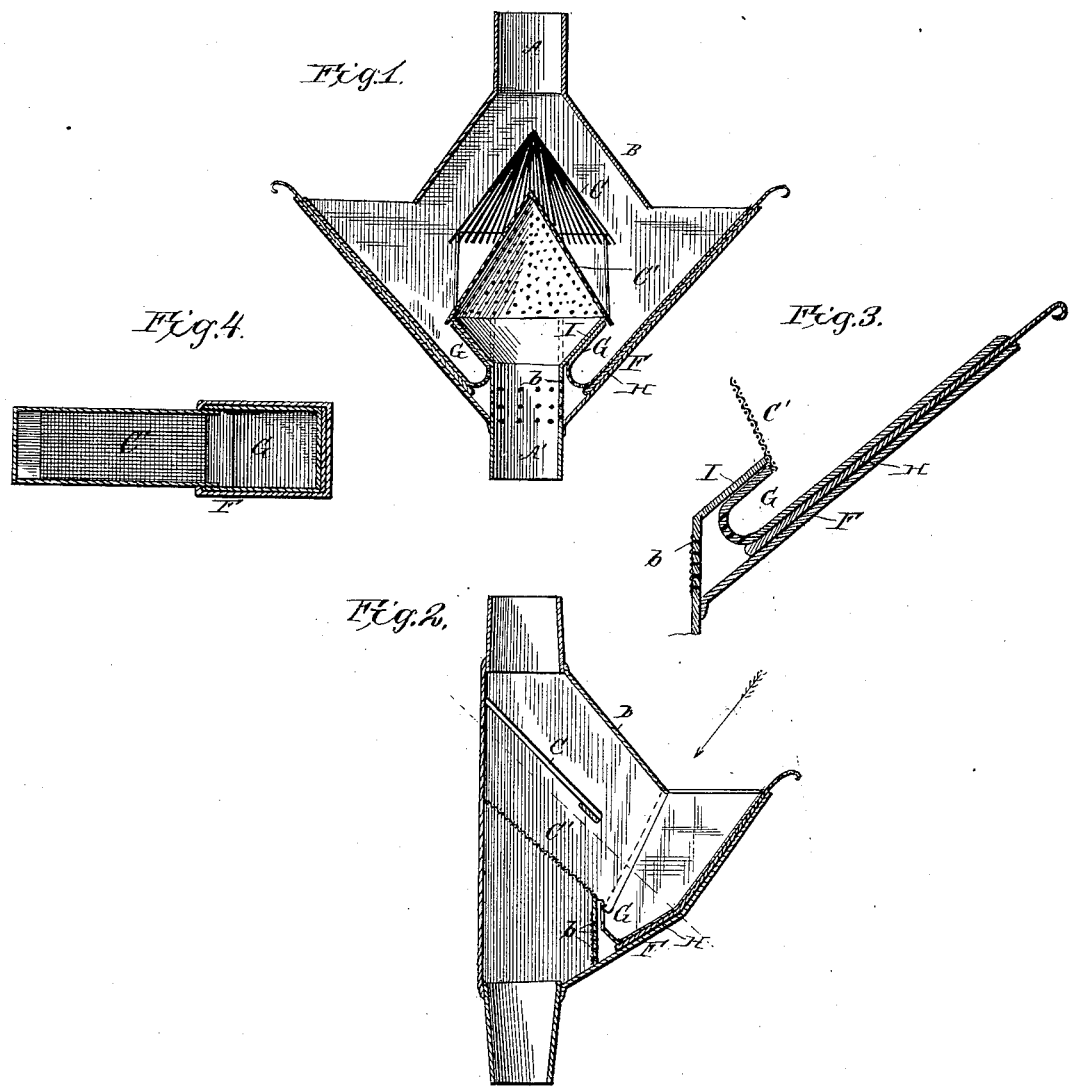
Witnesses;
Jos. A. Ryan
Nelson Guenther.
Thomas Lee,
Inventor;
by Chas. E. Barber
His Atty.

UNITED STATES PATENT OFFICE.

THOMAS LEE, OF CINCINNATI, OHIO.

COMBINED STRAINER AND TRAP FOR WATER-PIPES, &c.

SPECIFICATION forming part of Letters Patent No. 335,366, dated February 2, 1886.

Application filed November 27, 1885. Serial No. 184,031. (No model.)

*To all whom it may concern:*

Be it known that I, THOMAS LEE, a citizen of the United States, residing in the city of Cincinnati, in the county of Hamilton and State of Ohio, have invented certain new and useful Improvements in Combined Strainer and Trap for Water-Pipes, &c., of which the following is so full, clear, and exact a description as will enable one skilled in the art to which my invention appertains to make and use the same, reference being had to the accompanying drawings, in which—

Figure 1 is an elevated view of my device, partly in section. Fig. 2 is a view of a modification, showing the removable trap, as will be hereinafter fully explained. Fig. 3 is a vertical cross-section view of Fig. 1; and Fig. 4 is a plan view of Fig. 2, taken from the direction of the arrow, with the part above the line $x$ $x$ broken away.

The object of my invention is to produce a cheap and efficient combined trap and strainer which will come within the reach of the masses, and which will secure to the general public pure drinking-water from their cisterns.

Another object of my invention is to construct a filter which shall perfectly strain and purify all water which runs from the roof into the cistern, and separate from the water all bugs, caterpillars, leaves, droppings of birds, dirt, or sticks, or any other foreign or impure matter which is likely to accumulate on the roof of a building.

Still another object of my invention is to provide a strainer and trap which shall always be set and ready for use, and which will automatically separate any débris from the water.

Still another object of my invention is to produce a filter which will not clog up.

Heretofore filters have been used to purify water in various places; but such filters were likely to become clogged, or it was difficult to free them from dirt and foreign matter which accumulated in their traps. This obstacle is also overcome by my invention, as will be understood from the following description.

In the drawings, A A' represent the two usual conductor-connections in a water-pipe. B represents an inclined side of a part of this joint.

C represents a rack-bar, which deflects all débris out of a line between the upper and lower conductor-connections. This rack may be made of wire and secured inside of the filter in any suitable manner. It is obvious that slotted pieces of tin, zinc, copper, or other material, or a perforated deflector of any sort, might be substituted for the same without departing from the spirit of my invention. Between this rack C and the exit-conductor connection, and arranged transversely to the line of the conductor-connections, and preferably inclined from the rear of the joint toward the front, is a wire gauze or screen, C'. This screen is preferably secured rigidly across the main water-line. Just below the lower end of this screen is a recess or receptacle, G, into which is deposited the débris as it is deflected by the screen C'.

Surrounding the lower conductor-connection I provide a trap, F, the upper rim of which catches the débris as it is deflected from the course of the water. This trap is provided with a secondary removable trap, G', which is held up by the wedge H, and which is adapted to be removed from the main trap, as will be readily understood by reference to the drawings. This I deem of prime importance in this connection, as the débris is deposited in this removable trap, which by its construction may be readily removed, emptied, and cleansed, and quickly replaced. It will be readily understood that a conical screen may be used and a rack-bar of similar shape secured above it, as shown in Fig. 1. It is obvious that the flaring flange I on the upper part of the lower conductor-connection may be dispensed with, and the conductor-connection may extend up in a direct line to the inside of a conical screen, as shown in dotted lines in Fig. 1, without interfering with the usefulness of my invention. Just below this screen I perforate the connection A', as shown at $b$. This perforation or series of perforations is designed to be covered with screen material. It is obvious, however, that this secondary covering might be dispensed with and the perforations made smaller without departing from the spirit of my invention. It will be readily understood that these perforations are designed to allow any water which may be accidentally deflected into the trap to flow through into the main stream of water, and thence to the cistern. It will be seen at a glance that by this construction all accumulation of mud or permanent deposit of wet material or débris, which would tend to rust the pipe at this point, is entirely avoided, as it is separated from the water and thrown out of the main water-line. This I also deem of prime importance in this connection, as bugs and other insects will thus be enabled to crawl up the incline and fall out of the trap, which makes the combined strainer and trap virtually automatic or self-cleaning to a greater or less extent.

It is obvious that several minor details of my invention may be varied and substantial equivalents substituted therefor without affecting the usefulness of my invention.

I do not claim the construction, broadly, in this application, as it has been shown, described, and claimed by myself in another application which is now pending in the Patent Office, said case bearing date of September 17, 1885, No. 177,350.

Having fully explained the objects, usefulness, or advantages, and having set forth in detail a preferred form of the construction of my invention, what I desire to secure by Letters Patent, and what I therefore claim, is—

1. In a combined strainer and trap, the main casing provided with a deflecting-grating and a trap, the latter having a secondary removable trap, for the purposes stated.

2. In a combined strainer and trap, the main casing provided with a deflecting-grating and screen, in combination with a trap below said deflector and a secondary removable trap, all constructed and combined to operate substantially as and for the purposes hereinbefore stated.

3. In a combined strainer and trap, the main casing provided with an inclined grating or deflector, and also having a screen below said deflector, in combination with the removable trap, the main trap, and the perforated lower conductor-connection, substantially as described.

4. In a combined strainer and trap, the screen secured between the upper and lower connection, said lower connection provided with the flange F, in combination with the main casing, the secondary removable trap, and the wedge, substantially as and for the purposes hereinbefore stated.

5. In a combined strainer and trap, the main casing provided with a screen, and a trap attached to one side of the strainer out of the main water-line, in combination with the perforated lower conductor-connection below the screen and at the base of the secondary trap, whereby the water which may be deposited in the trap is allowed to flow out of said trap, substantially as described.

6. In a combined strainer and trap, the main casing provided with the screen and deflecting-grating, in combination with the perforated lower conductor-connection and the trap, said trap secured to the lower conductor-connection below the perforations $b$ in the lower conductor-connection of the main water-spout, substantially as described, whereby the water may flow from the trap without coming into contact with and defacing the outside of the filter or joint, as set forth.

7. In a combined strainer and trap, the combination of the main casing and the screen with the perforated lower conductor-connection, the trap, and the perforated secondary removable trap, substantially as and for the purposes stated.

In testimony that I claim the above I hereunto set my hand in presence of two subscribing witnesses.

THOMAS LEE.

Witnesses:
S. E. FULLER,
H. KUEMER.